United States Patent
Xiao et al.

(10) Patent No.: US 10,710,027 B2
(45) Date of Patent: Jul. 14, 2020

(54) REINFORCED OIL-ABSORPTIVE MEMBRANE MATERIAL, UNIT AND PREPARATION METHOD THEREOF

(71) Applicant: TIANJ IN POLYTECHNIC UNIVERSITY, Tianjin (CN)

(72) Inventors: Changfa Xiao, Tianjin (CN); Tai Zhang, Tianjin (CN); Junqiang Hao, Tianjin (CN); Jian Zhao, Tianjin (CN)

(73) Assignee: TIANJIN POLYTECHNIC UNIVERSITY, Tianjin (CN)

( * ) Notice: Subject to any disclaimer, the term of this patent is extended or adjusted under 35 U.S.C. 154(b) by 0 days.

(21) Appl. No.: 16/232,000

(22) Filed: Dec. 25, 2018

(65) Prior Publication Data

US 2019/0126209 A1     May 2, 2019

Related U.S. Application Data

(62) Division of application No. 15/209,728, filed on Jul. 13, 2016, now abandoned.

(30) Foreign Application Priority Data

Nov. 19, 2015   (CN) .......................... 2015 1 0807572

(51) Int. Cl.
    *B01D 69/02*     (2006.01)
    *B01D 69/04*     (2006.01)
    *B01D 69/10*     (2006.01)
    *B01D 69/14*     (2006.01)
    *B01D 71/02*     (2006.01)
    (Continued)

(52) U.S. Cl.
    CPC ............. *B01D 69/04* (2013.01); *B01D 69/02* (2013.01); *B01D 69/10* (2013.01); *B01D 69/148* (2013.01); *B01D 71/021* (2013.01); *B01D 71/34* (2013.01); *B29D 99/005* (2013.01); *B01D 2323/18* (2013.01); *B01D 2323/21* (2013.01); *B01D 2325/12* (2013.01); *B01D 2325/38* (2013.01); *B32B 1/08* (2013.01); *B32B 3/26* (2013.01); *B32B 3/266* (2013.01); *B32B 5/022* (2013.01); *B32B 5/08* (2013.01); *B32B 7/12* (2013.01); *B32B 27/12* (2013.01); *B32B 27/304* (2013.01); *B32B 27/32* (2013.01); *B32B 27/36* (2013.01); *B32B 27/40* (2013.01); *B32B 2255/02* (2013.01); *B32B 2255/26* (2013.01); *B32B 2262/0238* (2013.01); *B32B 2262/0253* (2013.01); *B32B 2262/0261* (2013.01); *B32B 2262/14* (2013.01); *B32B 2264/102* (2013.01); *B32B 2307/726* (2013.01); *B32B 2307/732* (2013.01); *B32B 2597/00* (2013.01)

(58) Field of Classification Search
None
See application file for complete search history.

Primary Examiner — Bradley R Spies (57) ABSTRACT

A reinforced oil-absorptive membrane material, includes: a tubular support (101) and an oil absorbing layer (102) provided on a surface of the tubular support (101), wherein a plurality of holes are provided on the tubular support (101); and the oil absorbing layer (102) is a piece of nonwoven fabric with a polymer layer provided thereon. The reinforced oil-absorptive membrane material has an excellent oil-absorbing and supportive performance, and is capable of being utilized continuously in a negative pressure suction manner and thus shows high oil absorption efficiency. A method for manufacturing the reinforced oil-absorptive membrane material including pre-treating the nonwoven fabrics by aqueous alkali, covering a membrane casting solution including a solvent, a graphene, polyvinylidene fluoride, pore-forming agent and inorganic particle, and then solidifying and extracting to obtain the oil-absorbing layer.

5 Claims, 3 Drawing Sheets (51) Int. Cl.
   *B01D 71/34*   (2006.01)
   *B29D 99/00*   (2010.01)
   *B32B 1/08*    (2006.01)
   *B32B 27/30*   (2006.01)
   *B32B 5/02*    (2006.01)
   *B32B 27/12*   (2006.01)
   *B32B 27/32*   (2006.01)
   *B32B 27/36*   (2006.01)
   *B32B 27/40*   (2006.01)
   *B32B 3/26*    (2006.01)
   *B32B 5/08*    (2006.01)
   *B32B 7/12*    (2006.01)

REINFORCED OIL-ABSORPTIVE MEMBRANE MATERIAL, UNIT AND PREPARATION METHOD THEREOF

CROSS REFERENCE OF RELATED APPLICATION

This is a Divisional application of an application having an application Ser. No. 15/209,728 filed on Jul. 13, 2016, which claims priority under 35 U.S.C. 119(a-d) to CN 201510807572.5, filed Nov. 19, 2015.

BACKGROUND OF THE PRESENT INVENTION

Field of Invention

The present invention relates to the field of oil-absorptive material, and more particularly to a preparation method of reinforced oil-absorptive membrane material and its unit.

Description of Related Arts

In recent years, oily waste water from the leakage of petroleum, industrial aliphatic organic solution, and discard solution have caused catastrophic harms to ocean, rivers and aquatic ecosystem. How to quickly remove oil pollutants from water surface and reduce oily wastewater pollution has attracted worldwide attention. Traditional oil-absorptive materials such as bombax ceiba, bentonite and pulp have been widely used in practical applications. However, they are still unable to meet the requirements of environmental treatment because of these shortcomings involving low oil absorption efficiency, poor oil-water selectivity and weak oil retention capacity etc.

To make up for the shortcomings of traditional oil-absorptive materials, some researchers have been developing new oil-absorptive materials such as oil-absorptive resin, oil-absorptive fibers, and porous polymer matrix graphene oil-absorptive materials. Gao et al. prepared a PVDF/graphene gel, hereinafter abbreviated as PVDF, by non-solvent diffusion method, followed by vacuum freeze-drying. The diffusion specifically proceeded by substituting water or methanol for DMF in the gel which constructed by PVDF and graphene, hereinafter abbreviated as DMF. Finally, a skinless porous PVDF/graphene gel with superhydrophobicity and superoleophilicity was obtained. This is from an article entitled *Superhydrophobic polyvinylidene fluoride/graphene porous materials*, published in the periodical *Carbon*, pages 5166-5172, No. 49, Vol. 49, 2011, i.e., *Superhydrophobic polyvinylidene fluoride/graphene porous materials. Carbon,* 2011, 49(49):5166-5172. Nguyen et al. immobilized graphene on melamine sponge, thereby preparing graphene-based sponge with good absorbing capacity and oil-water selectivity, wherein the absorption capacity is up to 165 times of its own weight. This is from an article entitled *Superhydrophobic and Superoleophilic Properties of Graphene-based Sponges Fabricated Using a Facile Dip Coating Method*, published in the periodical *Energy & Environmental Science*, pages 7908-7912, No. 7, Vol. 5, 2012, i.e. *Superhydrophobic and Superoleophilic Properties of Graphene-based Sponges Fabricated Using a Facile Dip Coating Method. Energy & Environmental Science,* 2012, 5(7):7908-7912. Wang Zitao et al prepared reduce graphene oxide based melamine sponge, abbreviated GROME by dipping melamine sponge in graphene oxide dispersion, followed by using hydrazine hydrate for online reduction. The obtained sponge is superhydrophobic and superoleophilic, with an oil absorption capacity up to 56-127 g/g. This is from an article entitled *Preparation and Absorption Preparation of Reduce Graphene Oxide-based Melamine Sponge and Its Absorption Properties*, published in *Chemical Journal of Chinese University*, pages 2410-2417, No. 11, Vol. 11, 2014. Patent CN103521199A discloses a kind of composite hollow tubular oil-absorptive material preparation method, which used hollow tubular polymeric material as a porous matrix layer, followed by dip-coating a graphene layer on the surface of the substrate. The resulting hollow tubular composite oil-absorptive material showed an outstanding absorption capacity, and its maximum static absorption capacity for trichloroethylene, kerosene and diesel is 169.4 g/g, 97.2 g/g, 88.6 g/g respectively. These polymer-based graphene oil-absorptive materials have good oil-water selectivity, high oil absorption efficiency, large storage volume and other characteristics, which makes their performance far better than traditional oil-absorptive materials. However, these oil-absorptive materials absorbs oil on their own, and therefore the adsorption process is intermittent, it is still unable to achieve continuous and efficient separation of water and oil; besides, their mechanical properties are poor, making it difficult to be applied to large-scale production.

A patent application 104128166A discloses a kind of hollow tubular oil-absorptive material preparation method: using a spring as its core, wrap the spring within a sheet of sponge which is prepared by dipping the sponge in graphene oxide dispersion solution, and on-line hydrazine hydrate steam reduction, rinsing, and vacuum drying, and then the material is prepared. Patent CN103801274A discloses a kind of oil-absorptive porous hollow fiber membrane preparation method, which uses graphene as surface absorbing layer and porous hollow fiber membrane as matrix layer, then reinforces the interface bonding between graphene and hollow fiber porous membrane through solvent treatment method or dilute solution treatment. These novel polymer-based graphene oil-absorptive materials have good oil-water selectivity, and if a negative pressure was connected on end of the resulting hollow fiber membrane, they could be competent for continuous oil/water separation, thus overcoming these shortcomings of traditional oil-absorptive materials such as the limited absorption capacity and intermittent working mode etc. However, due to poor mechanical properties, poor supporting performance for anti-pressure during working, and single-tube forms, the oil-absorptive material is still difficult to be widely used in practice.

SUMMARY OF THE PRESENT INVENTION

A first object of the present invention is to provide a reinforced oil-absorptive material with high oil/water separation efficiency which has an excellent oil-absorbing and supportive performance, and is capable of being utilized continuously in a negative pressure suction manner.

A second object of the present invention is to provide a method for manufacturing the reinforced oil-absorptive membrane material as mentioned above, which is simple, with inexpensive and suitable for practical application.

A third object of the present invention is to provide a reinforced oil-absorptive membrane material unit composed by multi-membrane which not only has an oil absorbing performance but also has an oil/water separation performance, and could be competent for continuous oil/water separation with high efficiency.

Accordingly, in order to accomplish the above objects, the present invention provides technical solutions as follows.

A reinforced oil-absorptive membrane material, comprises: a tubular support and an oil absorbing layer provided on a surface of the tubular support, wherein a plurality of holes are provided on the tubular support; and the oil absorbing layer is a piece of nonwoven fabric with a polymer layer coating thereon.

Preferably, the nonwoven fabric is a spun-bonded and spunlace blend nonwoven constructed by polyethylene glycol terephthalate and polyamide by a proportion of 7:3; the polymer layer comprises: polyvinylidene fluoride, graphene, hydrophobic inorganic particles and residual pore-forming agents.

Preferably, the hydrophobic inorganic particles are hydrophobic silica or hydrophobic titanium dioxide.

Preferably, materials of the tubular support are polyurethane (PU), polyethylene, polypropylene, polyamide and polyvinyl chloride.

Preferably, an external diameter of the tubular support is at a range of 8-12 mm, a thickness of a wall of the tubular support is at a range of 1-2 mm, a plurality of holes are provided on the tubular support, and a hole density of the plurality of holes is at a range of 2.54-7.62 PPI, and the diameter of the hole is at a range of 1-2 mm.

A method for manufacturing a reinforced oil-absorptive membrane material, comprising following steps of:

(1) pre-treating nonwoven fabric comprising: preparing aqueous alkali with a concentration of 1~6 wt. %, dipping the nonwoven fabric into aqueous alkali for 1-5 h, taking the nonwoven fabric out from the aqueous alkali and drying, so as to obtain a surface engraved nonwoven fabric;

(2) preparing membrane casting solution, wherein the solution for membrane casting comprises components of:

| | |
|---|---|
| solvent | 59~90 wt. %; |
| graphene | 0.1~1 wt. %; |
| polyvinylidene fluoride | 5~20 wt. %; |
| pore-forming agent | 2~20 wt. %; |
| inorganic particle | 1~5 wt. %; | wherein the solvent is a good solvent for polyvinylidene fluoride, the step of preparing the solution for membrane casting comprising: dispersing the graphene into the solvent, so as to obtain a graphene dispersion; then adding polyvinylidene fluoride, pore-forming agent and inorganic particle into the graphene dispersion, stirring for 3-6 hours at 60~90° C., so as to obtain the solution for membrane casting;

(3) preparing the oil absorbing layer, comprising: tiling the nonwoven fabric pre-treated in the step (1) on a glass plane and fixing, soaking the nonwoven fabric by the solvent used in the step (2), knifing on a surface thereof by the casting solution, and then dipping the glass plane into water with a temperature at a range of 10-50° C. for 12-48 hours and taking out, and then dipping into absolute ethyl alcohol for 12-24 hours, in such a manner that the pore-forming agent is extracted out, drying in a room temperature to a constant weight, so as to obtain nonwoven fabric with single membrane. And do the membrane casting process again for obtaining double coating as the desired oil absorbing layer;

(4) preparing the reinforced oil-absorptive material comprising: winding the oil absorbing layer on a tube wall of the tubular support, wherein the oil absorbing layer completely covers the plurality of holes on the tubular support, so as to obtain the reinforced oil-absorptive material.

Preferably, the solvent is selected from the group consisting of N,N-dimethyl formamide, N, N-dimethyl acetamide (DMAc), triethyl phosphate, N-methyl pyrrolidone, dimethyl sulfoxide; the hydrophobic inorganic particle is hydrophobic silica or hydrophobic titanium dioxide.

Preferably, the pore-forming agent is selected from the group consisting of dioctyl phthalate, di-n-octyl phthalate, dibutyl phthalate and diethyl phthalate (DEP).

The knifing method in the step (3) comprising: fixing a piece of non-woven fabric on the glass plane in the membrane casting equipment, evenly pouring the casting solution on the surface, turning on the membrane casting equipment to evenly casting solution on a surface of the nonwoven fabric, knifing it again for the desired oil absorbing layer.

In the step (4), a method for winding the oil-absorbing layer to a tube wall of the tubular support is a helically wound edge-pressing method, i.e., cutting the oil absorbing layer into a rhombus, winding one end aligning at a position above the tube wall with small holes, in such a manner that an edge of each winding layer is pressing on the previous one, till completely covering all holes distributed on the tubular support, then the coincident position of the winding layer is adhesively sealed.

A unit for the reinforced oil-absorptive membrane material comprises: a frame, a suspension device, a plurality of reinforced oil-absorptive materials provided on an external side of the frame; and the regarding joints provided on both ends of the reinforced oil-absorptive material, wherein these joints connect the reinforced oil-absorptive material and the frame to form an integral; wherein the suspension device attached to the frame ensures the floating on water surface, specially, the buoyancy force of the suspension device in water is greater than or equal to a gravity of the reinforced oil-absorptive material. The frame is formed by joint pipes and some joints for external connection of vacuum device.

Preferably, the reinforced oil-absorptive material is connected with the frame by a branch joint, wherein the frame is a polyurethane pipe, a polyethylene pipe, a polypropylene pipe, polyamide pipe or polyvinyl chloride pipe, wherein the suspension device origins from high density polyethylene foam.

A method for manufacturing a unit of the reinforced oil-absorptive unit, comprises steps of:

1) binding the suspension device to a frame formed by pipes, in such a manner that the suspension device is capable of adjusting height of the suspension device by rotating.

2) connecting the reinforced oil-absorptive material with the frame by a three-way joint, so as to form a through way inside the frame. When the joint provided on the frame is connected with a vacuum device, a negative pressure is provided on one end or two ends of the reinforced oil absorptive membrane material.

Compared with the conventional art, the present invention has following beneficial effects.

1. The reinforced oil-absorptive membrane material provided by the present invention takes a nonwoven fabric as a reinforcement which is obtained using the double coating method. The reinforced oil absorptive material not only has high oil absorption, could be competent for continuous oil/water separation, but also possesses a high mechanical properties as well as good peel strength performance, which effectively extends the service life of oil-absorptive membrane material and its unit.

2. When the reinforced oil-absorptive membrane material was connected to the unit, it could be applied to an oil/water separation system, the unit was suspended in water, with a joint of the component provides negative pressure, it could be competent for continuously and rapidly dynamic oil adsorption and separation from water/oil system, and greatly improve the efficiency of oil-water separation. Mass transfer mechanism of adsorption and separation is proposed: when the oil is in contact with the membrane surface, due to the hydrophobic-superoleophilic properties, especially graphene on membrane surface preferentially adsorbs the oil, and driven by the negative pressure so that the oil passing through the reinforced oil-absorptive membrane into the module and transported along the pipe to the oil storage. The unit is capable of not only achieving a continuous oil/water separation, but also integrates the separation with oil recovery. Furthermore, the unit is easy to be expanded and has broad prospects and great practical value.

These and other objectives, features, and advantages of the present invention will become apparent from the following detailed description, the accompanying drawings, and the appended claims.

DETAILED DESCRIPTION OF THE PREFERRED EMBODIMENT

Combing with the accompanying drawings and the preferred embodiments, further description of the technical solution of the present invention is as follows.

Example 1

Figure 1:
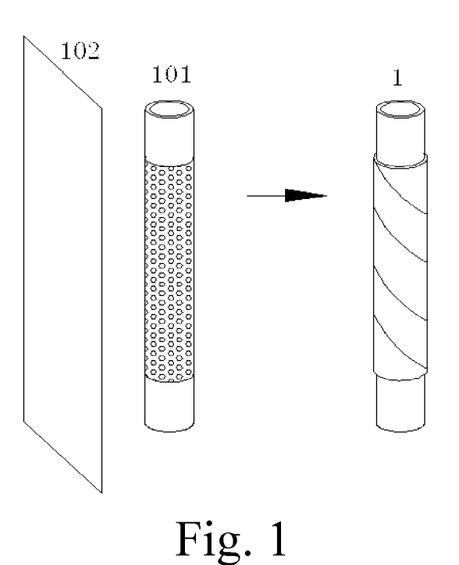
FIG. 1 is a structural sketch view of a single reinforced oil-absorptive membrane material manufactured according to a preferred embodiment 1 of the present invention.

A method for preparing a reinforced oil-absorptive membrane material comprising following steps of:

(1) alkali-treating nonwoven fabric comprising: preparing aqueous sodium hydroxide with a concentration of 3 wt. %, dipping the nonwoven fabric into aqueous sodium hydroxide at 90° C. for 3 h, taking the nonwoven fabric out from the aqueous sodium hydroxide and drying, so as to obtain a surface engraved nonwoven fabric, wherein the nonwoven fabric is a spun-bonded and spunlace blend nonwoven formed by polyethylene glycol terephthalate and polyamide by a proportion of 7:3 by weight;

(2) preparing the solution for membrane casting, wherein the membrane casting solution comprising:

mixing 0.5 g of graphene and 72.5 g of N,N-dimethylacetamide, performing ultrasonic dispersion for 2 hours to obtain graphene dispersion, then adding 13 g polyvinylidene fluoride, 10 g of dioctyl phthalate, 4 g of hydrophobic silica into the graphenegraphene dispersion, stirring at 70° C. for 3 hours, so as to obtain the solution for membrane casting;

wherein the step (1) and the step (2) are not necessarily in that order, and can be carried out simultaneously according to the time arrangement of experiments;

(3) preparing the oil absorbing layer, comprising: tiling the nonwoven fabric pre-treated in the step (1) fixing the nonwoven fabric on the glass plane, soaking the nonwoven fabric by 20 mL N, N-dimethyl acetamide in previous, and then putting on a membrane casting equipment, wherein one end of the nonwoven fabric is fixed; the casting solution prepared in the step (2) is evenly poured on a surface of the nonwoven fabric, turning on the membrane blade casting equipment to evenly cover the membrane casting membrane solution on a surface of the non-woven fabric, then the glass plane with nonwoven fabric is dipped into water at 20° C. for 24 hours and taking out, then dipping into absolute ethyl alcohol for 24 hours to extract pore-forming agent, drying in a room temperature to a constant weight, so as to obtain a single coating reinforcement membrane. And do the membrane casting process again for obtaining double coating as the oil absorbing layer;

(4) preparing the reinforced oil-absorptive material comprising: winding the oil absorbing layer obtained in the step (3) on a tube wall of the tubular support by a helically wound edge-pressing method, wherein the nonwoven with the oil absorbing layer completely covers the holes on the tubular support, two ends of the oil-absorbing layer is adhesively sealed fixed at a tube wall of the polyurethane tube, pressing position of the winding layer is adhesively sealed, so as to obtain the reinforced oil-absorptive material, wherein as shown in FIG. 1, an external diameter of the polyurethane pipe is 10 mm, a thickness of the pipe wall is 2 mm, a length thereof is 210 mm, and two end of the pipe are respectively two sclausura areas with a length of 30 mm, and a middle portion of the pipe is a perforated area with a length of 150 mm, a pore density of the perforated area is 5.927 PPI and a diameter is 1 mm.

Figure 2:
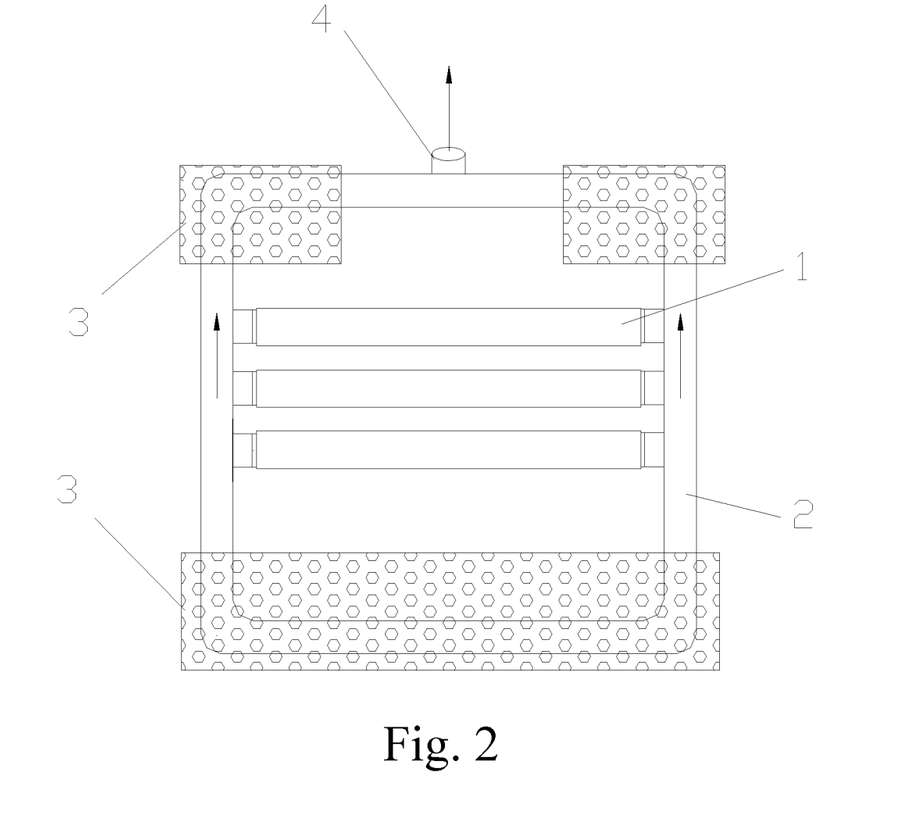
FIG. 2 is a three-parallel reinforced oil-absorptive membrane unit manufactured according to the preferred embodiment 1 of the present invention.

A method for preparing a unit utilizing the reinforcement oil-absorptive membrane material is as follows; setting the frame 2 to be a rectangle or a square, a joint 4 for connecting a vacuum device, firstly binding the suspension device 3 (i.e., high density polyethylene foam) to a position (not the position of the joint) of the pipe serving as the frame 4, then connecting the three reinforced oil-absorptive material 1 in parallel to an interior of the frame 2 by joints, in such a manner that a unit 16 is obtained, as shown in FIG. 2.

Figure 3:
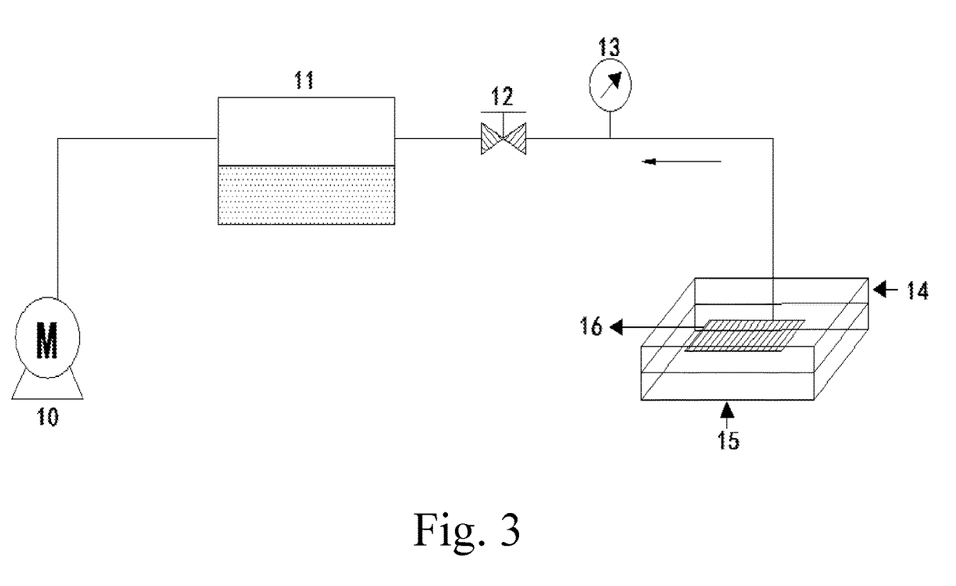
FIG. 3 is a structural sketch view of a continuously oil/water separation experimental device of an oil-absorptive membrane unit.

Referring to FIG. 3, while utilizing, the joints 4 of the unit 16 are respectively connected with a pressure gage 13, a valve 12, an oil storage tank 11 and a vacuum pump 10, wherein the unit 16 is floated on water 15 with oil slick on a surface. When the vacuum pump 10 is turned on, a negative pressure is provided on two ends of the reinforced oil-absorptive material 1 of the unit 16, the oil slick 14 is absorbed by the oil-absorbing layer and then enters an internal cavity of the reinforced oil-absorptive material, so as to serve as the pipe of the frame, and the oil slick is vacuumed from the joints 4, enters and stored in the oil tank 11. The unit of the present invention is not only capable of accomplishing the oil-absorbing work but also capable of collecting the oil into the oil storage tank.

After testing, the reinforced oil-absorptive material and the unit manufactured in the preferred embodiment of the present invention has a water enter pressure of 1.2 bar, and when the unit is provided in a kerosene/water mixture, a kerosene flux of the unit is 244.40 L/m$^2$·h under 0.7 bar.

Example 2

A method for preparing a reinforced oil-absorptive membrane material comprising following steps of:

(1) alkali-treating nonwoven fabric comprising: preparing aqueous sodium hydroxide with a concentration of 2 wt. %, dipping the nonwoven fabric into 80° C. aqueous sodium hydroxide for 2 h, taking the nonwoven fabric out from the aqueous sodium hydroxide and drying, so as to obtain a surface engraved nonwoven fabric, wherein the nonwoven fabric is a spun-bonded spunlace blended by polyethylene glycol terephthalate and polyamide by a proportion of 7:3;

(2) preparing membrane casting solution, wherein the membrane casting solution comprising:

mixing 0.3 g graphene and 68.7 g N, N-dimethyl formamide, performing ultrasonic dispersion for 2 hours to obtain graphene dispersion, then adding 17 g polyvinylidene fluoride, 10 g dioctyl phthalate, 4 g hydrophobic silica to liquid of the graphene dispersion, stirring for 3 hours under 60° C., so as to obtain the membrane casting solution;

wherein the step (1) and the step (2) are not necessarily in order, and can be carried out simultaneously according to the time arrangement of experiments;

(3) preparing the oil absorbing layer, comprising: tiling the nonwoven fabric pre-treated in the step (1) on a glass plane and fixing a peripheral of the nonwoven fabric to the glass plane, soaking the nonwoven fabric by 20 ml N,N-dimethyl formamide and putting on a membrane casting equipment, wherein one end of the nonwoven fabric is fixed; the membrane casting solution prepared in the step (2) is evenly poured on a surface of the nonwoven fabrics, turning on the membrane casting equipment to evenly cover the membrane casting solution on a surface of the nonwoven fabrics, then the glass plane with nonwoven fabrics fixed thereon is dipped into 20° C. water, waiting 12 hours and taking out, then dipping into absolute ethyl alcohol for 12 hours to extract pore-forming agent, drying in a room temperature to a constant weight, so as to obtain a single covered reinforcement membrane, performing secondary knifing on the single covered reinforced membrane by the membrane casting solution, then dipping the glass plane to 20° C. water for 12 hours, and then into ethyl alcohol for 12 hours in sequence, drying in a room temperature to a constant weight, in such a manner that the oil-absorbing layer is obtained;

(4) preparing the reinforced oil-absorptive material comprising: winding the oil absorbing layer obtained in the step (3) on a tube wall of the tubular support by an edge-pressing winding, wherein the oil absorbing layer completely covers the plurality of holes on the tubular support, two ends of the oil-absorbing layer is adhesively sealed with a contact of a surface of a tube wall of the polyurethane tube, pressing position of the winding layer is adhesively sealed, so as to obtain the reinforced oil-absorptive material, wherein an external diameter of the polyurethane pipe is 12 mm, a thickness of the pipe wall is 230 mm, and two end of the pipe are respectively two sclausura areas with a length of 40 mm, and a middle portion of the pipe is a perforated area with a length of 150 mm, a pore density of the perforated area is 3.527 PPI and a diameter is 1.2 mm.

A method for preparing a unit and the utilization state is identical to the example 1.

After testing, the reinforced oil-absorptive material and the unit manufactured in the preferred embodiment of the present invention has a water enter pressure of 1.5 bar, and when the unit is provided in a kerosene/water mixture, a kerosene flux of the unit is 127.60 L/m$^2$·h under 0.7 bar.

Example 3

A method for preparing a reinforced oil-absorptive membrane material comprising following steps of:

(1) alkali-treating nonwoven fabric comprising: preparing aqueous sodium hydroxide with a concentration of 3 wt. %, dipping the nonwoven fabric into 80° C. aqueous sodium hydroxide for 2 h, taking the nonwoven fabric out from the aqueous sodium hydroxide and drying, so as to obtain a surface engraved nonwoven fabric, wherein the nonwoven fabric is a spun-bonded spunlace blended by polyethylene glycol terephthalate and polyamide by a proportion of 7:3;

(2) preparing membrane casting solution, wherein the membrane casting solution comprising:

mixing 0.3 g of graphene and 70.7 g of N,N-dimethylacetamide, performing ultrasonic dispersion for 3 hours to obtain graphene dispersion, then adding 13 g polyvinylidene fluoride, 12 g dioctyl phthalate, 4 g hydrophobic silica to liquid of the graphene dispersion, stirring for 4 hours under 70° C., so as to obtain the membrane casting solution;

wherein the step (1) and the step (2) are not necessarily in order, and can be carried out simultaneously according to the time arrangement of experiments;

(3) preparing the oil absorbing layer, comprising: tiling the nonwoven fabric pre-treated in the step (1) on a glass plane and fixing a peripheral of the nonwoven fabric to the glass plane, soaking the nonwoven fabric by 20 ml N, N-dimethyl acetamide and putting on a membrane casting equipment, wherein one end of the the nonwoven fabric is fixed; the membrane casting solution prepared in the step (2) is evenly poured on a surface of the nonwoven fabrics, turning on the membrane casting equipment to evenly cover the membrane casting solution on a surface of the nonwoven fabrics, then the glass plane with nonwoven fabrics fixed thereon is dipped into 20° C. water, waiting 18 hours and taking out, then dipping into absolute ethyl alcohol for 18 hours to extract pore-forming agent, drying in a room temperature to a constant weight, so as to obtain a single covered reinforcement membrane, performing secondary knifing on the single covered reinforced membrane by the membrane casting solution, then dipping the glass plane to 20° C. for 18 hours, and then into ethyl alcohol for 18 hours in sequence, drying in a room temperature to a constant weight, in such a manner that the oil-absorbing layer is obtained;

(4) preparing the reinforced oil-absorptive material comprising: winding the oil absorbing layer obtained in the step (3) on a tube wall of the tubular support by an edge-pressing winding, wherein the oil absorbing layer completely covers the plurality of holes on the tubular support, two ends of the oil-absorbing layer is adhesively sealed with a contact of a surface of a tube wall of the polypropylene tube, the coincident pressing position of the winding layer is adhesively sealed, so as to obtain the reinforced oil-absorptive material, wherein an external diameter of the polypropylene pipe is 12 mm, a thickness of the pipe wall is 2 mm, a length thereof is 210 mm, and two ends of the pipe are respectively two non-porous regions with a length of 30 mm, and a middle portion of the pipe is a perforated area with a length of 150 mm, a pore density of the perforated area is 5.927 PPI and a diameter is 1 mm.

A method for preparing a unit and the utilization state is identical to the example 1.

After testing, the reinforced oil-absorptive material and its unit manufactured in the preferred embodiment of the present invention has a water enter pressure of 1.1 bar, and when the unit is provided in a kerosene/water mixture, a kerosene flux of the unit is 266.92 L/m$^2$·h under 0.7 bar.

Example 4

A method for preparing a reinforced oil-absorptive membrane material comprising following steps of:

(1) alkali-treating nonwoven fabric comprising: preparing aqueous sodium hydroxide with a concentration of 3 wt. %, dipping the nonwoven fabric into aqueous sodium hydroxide at 80° C. for 3 h, taking the nonwoven fabric out from the aqueous sodium hydroxide and drying, so as to obtain a surface engraved nonwoven fabric, wherein the nonwoven fabric is a spun-bonded and spunlace blend nonwoven formed by polyethylene glycol terephthalate and polyamide by a proportion of 7:3;

(2) preparing the solution for membrane casting, wherein the membrane casting solution comprising:

mixing 0.5 g of graphene and 72.5 g of triethyl phosphate, performing ultrasonic dispersion for 3 hours to obtain graphene dispersion, then adding 12 g polyvinylidene fluoride, 10 g of diethyl phthalate, 5 g of hydrophobic Titanium Dioxide into liquid of the graphene dispersion, stirring at 70° C. for 3 hours, so as to obtain the solution for membrane casting;

wherein the step (1) and the step (2) are not necessarily in order, and can be carried out simultaneously according to the time arrangement of experiments;

(3) preparing the oil absorbing layer, comprising: tiling the nonwoven fabric pre-treated in the step (1) fixing the nonwoven fabricon the glass plane, soaking the nonwoven fabric by 15 ml triethyl phosphate in previous, and then putting on a membrane casting equipment, wherein one end of the nonwoven fabric is fixed; the membrane casting solution prepared in the step (2) is evenly poured on a surface of the nonwoven fabrics, turning on the membrane casting equipment to evenly cover the membrane casting solution on a surface of the nonwoven fabrics, then the glass plane with nonwoven fabrics fixed thereon is dipped into water at 20° C. for 24 hours and taking out, then dipping into absolute ethyl alcohol for 24 hours to extract pore-forming agent, drying in a room temperature to a constant weight, so as to obtain a single coating reinforcement membrane, performing secondary knifing on the single covered reinforced membrane by the membrane casting solution, then dipping the glass plane to 20° C. water for 24 hours, and then into ethyl alcohol for 24 hours in sequence, drying in a room temperature to a constant weight, in such a manner that the oil-absorbing layer is obtained;

(4) preparing the reinforced oil-absorptive material comprising: winding the oil absorbing layer obtained in the step (3) on a tube wall of the tubular support by a helically wound edge-pressing method, wherein the nonwoven with the oil absorbing layer completely covers the plurality of holes on the tubular support, two ends of the oil-absorbing layer is adhesively sealed fixed at a tube wall of the polyurethane tube, pressing position of the winding layer is adhesively sealed, so as to obtain the reinforced oil-absorptive material, wherein an external diameter of the polyurethane pipe is 10 mm, a thickness of the pipe wall is 2 mm, a length thereof is 210 mm, and two end of the pipe are respectively two sclausura areas with a length of 30 mm, and a middle portion of the pipe is a perforated area with a length of 150 mm, a pore density of the perforated area is 5.488 PPI and a diameter is 1.2 mm.

A method for preparing a unit and the utilization state is identical to the example 1.

After testing, the reinforced oil-absorptive material and the unit manufactured in the preferred embodiment of the present invention has a water enter pressure of 1.3 bar, and when the unit is provided in a kerosene/water mixture, a kerosene flux of the unit is 217.40 L/m$^2$·h under 0.7 bar.

Example 5

A method for preparing a reinforced oil-absorptive membrane material comprising following steps of:

(1) alkali-treating nonwoven fabric comprising: preparing aqueous sodium hydroxide with a concentration of 3 wt. %, dipping the nonwoven fabric into aqueous sodium hydroxide at 90° C. for 3 h, taking the nonwoven fabric out from the aqueous sodium hydroxide and drying, so as to obtain a surface engraved nonwoven fabric, wherein the nonwoven fabric is a spun-bonded and spunlace blend nonwoven formed by polyethylene glycol terephthalate and polyamide by a proportion of 7:3;

(2) preparing the solution for membrane casting, wherein the membrane casting solution comprising:

mixing 0.7 g of graphene and 72.3 g of N-methyl pyrrolidone, performing ultrasonic dispersion for 3 hours to obtain graphene dispersion, then adding 12 g polyvinylidene fluoride, 11 g of dibutyl phthalate, 4 g of hydrophobic silica into liquid of the graphene dispersion, stirring at 70° C. for 3 hours, so as to obtain the solution for membrane casting;

wherein the step (1) and the step (2) are not necessarily in order, and can be carried out simultaneously according to the time arrangement of experiments;

(3) preparing the oil absorbing layer, comprising: tiling the nonwoven fabric pre-treated in the step (1) and fixing the nonwoven fabric on the glass plane, soaking the nonwoven fabric by 15 ml N-methyl pyrrolidone in previous, and then putting on a membrane casting equipment, wherein one end of the nonwoven fabric is fixed; the membrane casting solution prepared in the step (2) is evenly poured on a surface of the nonwoven fabrics, turning on the membrane casting equipment to evenly cover the membrane casting solution on a surface of the nonwoven fabric, then the glass plane with nonwoven fabrics fixed thereon is dipped into water at 20° C. for 24 hours and taking out, then dipping into absolute ethyl alcohol for 24 hours to extract pore-forming agent, drying in a room temperature to a constant weight, so as to obtain a single coating covered reinforcement membrane, performing secondary knifing on the single covered reinforced membrane by the membrane casting solution, then dipping the glass plane to 20° C. water for 24 hours, and then into ethyl alcohol for 24 hours in sequence, drying in a room temperature to a constant weight, in such a manner that the oil-absorbing layer is obtained;

(4) preparing the reinforced oil-absorptive material comprising: winding the oil absorbing layer obtained in the step (3) on a tube wall of the tubular support by a helically wound edge-pressing method, wherein the nonwoven with the oil absorbing layer completely covers the plurality of holes on the tubular support, two ends of the oil-absorbing layer is adhesively sealed fixed at a tube wall of the polypropylene tube, pressing position of the winding layer is adhesively sealed, so as to obtain the reinforced oil-absorptive material, wherein an external diameter of the polypropylene pipe is 10 mm, a thickness of the pipe wall is 2 mm, a length thereof is 210 mm, and two end of the pipe are respectively two sclausura areas with a length of 30 mm, and a middle portion of the pipe is a perforated area with a length of 150 mm, a pore density of the perforated area is 4.544 PPI and a diameter is 1 mm.

A method for preparing a unit and the utilization state is identical to the example 1.

After testing, the reinforced oil-absorptive material and the unit manufactured in the preferred embodiment of the present invention has a water enter pressure of 1.0 bar, and when the unit is provided in a diesel oil/water mixture, a diesel oil flux of the unit is 80.64 L/m²·h under 0.7 bar.

Example 6

A method for preparing a reinforced oil-absorptive membrane material comprising following steps of:

(1) alkali-treating nonwoven fabric comprising: preparing aqueous sodium hydroxide with a concentration of 3 wt. %, dipping the nonwoven fabric into aqueous sodium hydroxide at 70° C. for 2 h, taking the nonwoven fabric out from the aqueous sodium hydroxide and drying, so as to obtain a surface engraved nonwoven fabric, wherein the nonwoven fabric is a spun-bonded and spunlace blend nonwoven formed by polyethylene glycol terephthalate and polyamide by a proportion of 7:3;

(2) preparing the solution for membrane casting, wherein the membrane casting solution comprising:

mixing 0.5 g of graphene and 73.5 g of N,N-dimethylacetamide, performing ultrasonic dispersion for 2 hours to obtain graphene dispersion, then adding 12 g of polyvinylidene fluoride, 10 g of dioctyl phthalate, 4 g of hydrophobic silica into liquid of the graphene dispersion, stirring at 70° C. for 4 hours, so as to obtain the solution for membrane casting;

wherein the step (1) and the step (2) are not necessarily in order, and can be carried out simultaneously according to the time arrangement of experiments;

(3) preparing the oil absorbing layer, comprising: tiling the nonwoven fabric pre-treated in the step (1) and fixing the nonwoven fabric on the glass plane, soaking the nonwoven fabric by 12 ml N, N-dimethyl acetamide in previous and putting on a membrane casting equipment, wherein one end of the nonwoven fabric is fixed; the membrane casting solution prepared in the step (2) is evenly poured on a surface of the nonwoven fabrics, turning on the membrane casting equipment to evenly cover the membrane casting solution on a surface of the nonwoven fabrics, then the glass plane with nonwoven fabrics fixed thereon is dipped into water at 20° C. for 20 hours and taking out, then dipping into absolute ethyl alcohol for 20 hours to extract pore-forming agent, drying in a room temperature to a constant weight, so as to obtain a single coating covered reinforcement membrane, performing secondary knifing on the single covered reinforced membrane by the membrane casting solution, then dipping the glass plane to 20° C. for 20 hours, and then into ethyl alcohol for 20 hours in sequence, drying in a room temperature to a constant weight, in such a manner that the oil-absorbing layer is obtained;

(4) preparing the reinforced oil-absorptive material comprising: winding the oil absorbing layer obtained in the step (3) on a tube wall of the tubular support by a helically wound edge-pressing method, wherein the nonwoven with the oil absorbing layer completely covers the plurality of holes on the tubular support, two ends of the oil-absorbing layer is adhesively sealed fixed at a tube wall of the polyurethane tube, pressing position of the winding layer is adhesively sealed, so as to obtain the reinforced oil-absorptive material, wherein an external diameter of the polyurethane pipe is 8 mm, a thickness of the pipe wall is 2 mm, a length thereof is 180 mm, and two end of the pipe are respectively two sclausura areas with a length of 30 mm, and a middle portion of the pipe is a perforated area with a length of 150 mm, a pore density of the perforated area is 5.563 PPI and a diameter is 1.2 mm.

A method for preparing a unit and the utilization state is identical to the example 1.

After testing, the reinforced oil-absorptive material and the unit manufactured in the preferred embodiment of the present invention has a water enter pressure of 1.2 bar, and when the unit is provided in a kerosene/water mixture, a kerosene flux of the unit is 234.64 L/m²·h under 0.7 bar.

The results of the oil flux in a kerosene/water mixture of the reinforced oil-absorptive membrane material and its unit manufactured in the Example 1-6 are summarized in Table 1, which shows a continuously oil absorbing and oil-water separation performance.

TABLE 1

Oil flux of the reinforced oil-absorptive unit manufactured in the examples 1-6.

| Examples | Test Pressure (bar) | Oil flux tested at different time (L/m²·h) | | | | | |
|---|---|---|---|---|---|---|---|
| | | 5 min | 10 min | 15 min | 20 min | 25 min | 30 min |
| 1 | 0.7 | 244.40 | 236.19 | 219.92 | 212.65 | 201.36 | 192.94 |
| 2 | 0.7 | 127.60 | 123.13 | 114.94 | 110.58 | 101.32 | 90.46 |
| 3 | 0.7 | 266.92 | 252.21 | 245.06 | 236.71 | 231.51 | 225.64 |
| 4 | 0.7 | 217.40 | 210.24 | 201.72 | 193.26 | 185.57 | 176.25 |
| 5 | 0.7 | 80.64 | 76.72 | 72.04 | 68.50 | 62.37 | 58.64 |
| 6 | 0.7 | 234.64 | 226.58 | 216.74 | 204.56 | 197.36 | 189.94 |

Before testing, a highest critical pressure (HPP) of the reinforced oil-absorptive membrane material and its unit when water enters is determined. Then, to ensure that the unit only absorbs oil and does not absorb water, kerosene flux or diesel is tested under a condition less than the HPP. The oil flux testing indicated that the reinforced oil-absorptive unit manufactured by the present invention is capable of absorbing oil while performing oil-water separation, so as to achieve an object of dynamic oil-water separation.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for manufacturing a reinforced oil-absorptive membrane material, comprising steps of:

(1) pre-treating nonwoven fabric comprising: preparing aqueous alkali with a concentration of 1-6 wt. %, dipping the nonwoven fabric into the aqueous alkali for 1-5 h at 60-90° C., taking the nonwoven fabric out from the aqueous alkali and drying, so as to obtain a surface engraved nonwoven fabric;

(2) preparing solution for membrane casting, wherein the membrane casting solution comprises components of:

| solvent | 59-90 wt. %; |
|---|---|
| graphene | 0.1-1 wt. %; |
| polyvinylidene fluoride | 5-20 wt. %; |
| pore-forming agent | 2-20 wt. %; |
| inorganic particle | 1-5 wt. %; | wherein the solvent is a good solvent for polyvinylidene fluoride, the step of preparing membrane casting solution comprising: dispersing the graphene into the solvent, so as to obtain a graphene dispersion; then adding polyvinylidene fluoride, pore-forming agent and inorganic particle to the graphene dispersion, stirring for 3-6 hours under 60~90° C., so as to obtain the solution for membrane casting;

(3) preparing the oil absorbing layer, comprising: tiling the nonwoven fabric pre-treated in the step (1) on a glass plane and fixing, soaking the nonwoven fabric by the solvent used in the step (2), knifing on a surface thereof by the membrane casting solution, dipping the glass plane with nonwoven fabric thereon into water with a temperature at a range of 10-50° C., waiting for 12-48 hours and taking out, and then dipping into absolute ethyl alcohol for 12-24 hours, in such a manner that the pore-forming agent is extracted out, drying, so as to obtain nonwoven fabric with single coated membrane; then knifing on a surface thereof by the membrane casting solution again, dipping the glass plane into water with a temperature at a range of 10-50° C., waiting for 12-48 hours and taking out, and then dipping into absolute ethyl alcohol for 12-24 hours, drying, so as to obtain desired oil absorbing layer;

(4) preparing the reinforced oil-absorptive material comprising: winding the oil absorbing layer obtained in the step (3) on a tube wall of the porous tubular support, wherein the oil absorbing layer completely covers the pores on the tubular support, so as to obtain the reinforced oil-absorptive material.

2. The method for preparing the reinforced oil-absorptive membrane material, as recited in claim 1, wherein the nonwoven fabric is a spun-bonded spunlace blended by polyethylene glycol terephthalate and polyamide by a proportion of 7:3, the solvent is selected from the group consisting of N,N-dimethyl formamide, N,N-dimethyl acetamide (DMAc), triethyl phosphate, N-methyl pyrrolidone, and dimethyl sulfoxide; the inorganic particle is hydrophobic silica or hydrophobic titanium dioxide.

3. The method for preparing the reinforced oil-absorptive membrane material, as recited in claim 1, wherein the pore-forming agent is selected from the group consisting of dioctyl phthalate, di-n-octylphthalate, dibutylphthalate and diethylphthalate (DEP).

4. A method for manufacturing a reinforced oil-absorptive membrane material comprising steps of:

(1) alkali-treating nonwoven fabric comprising: preparing aqueous sodium hydroxide with a concentration of 3 wt. %, dipping the nonwoven fabric into aqueous sodium hydroxide at 90° C. for 3 h, taking the nonwoven fabric out from the aqueous sodium hydroxide and drying, so as to obtain a surface engraved nonwoven fabric, wherein the nonwoven fabric is a spun-bonded and spunlace blend nonwoven formed by polyethylene glycol terephthalate and polyamide by a proportion of 7:3 by weight;

(2) preparing the solution for membrane casting, wherein the membrane casting solution comprising:

mixing 0.5 g of graphene and 72.5 g of N,N-dimethylacetamide, performing ultrasonic dispersion for 2 hours to obtain graphene dispersion, then adding 13 g polyvinylidene fluoride, 10 g of dioctyl phthalate, 4 g of hydrophobic silica into the graphene dispersion, stirring at 70° C. for 3 hours, so as to obtain the solution for membrane casting;

wherein the step (1) and the step (2) are not necessarily in order, and can be carried out simultaneously according to the time arrangement of experiments;

(3) preparing the oil absorbing layer, comprising: tiling the nonwoven fabric pre-treated in the step (1), fixing the nonwoven fabric on the glass plane, soaking the nonwoven fabric by 20 mL N,N-dimethyl acetamide in previous, and then putting on a membrane casting equipment, wherein one end of the nonwoven fabric is fixed; the casting solution prepared in the step (2) is evenly poured on a surface of the nonwoven fabric, turning on the membrane casting equipment to evenly cover the membrane casting solution on a surface of the non-woven fabric, then the glass plane with nonwoven fabric is dipped into water at 20° C. for 24 hours and taking out, then dipping into absolute ethyl alcohol for 24 hours to extract pore-forming agent, drying, so as to obtain a single coating reinforcement membrane, and do the membrane casting process again for obtaining double coating as the oil absorbing layer;

(4) preparing the reinforced oil-absorptive material comprising: winding the oil absorbing layer obtained in the step (3) on a tube wall of the tubular support, wherein the nonwoven with the oil absorbing layer completely covers the plurality of holes on the tubular support, two ends of the oil-absorbing layer is adhesively sealed and fixed at a tube wall of the polyurethane tube, pressing position of the winding layer is adhesively sealed, so as to obtain the reinforced oil-absorptive material, wherein as shown in FIG. 1, an external diameter of the polyurethane pipe is 10 mm, a thickness of the pipe wall is 2 mm, a length thereof is 210 mm, and two end of the pipe are respectively two sclausura areas with a length of 30 mm, and a middle portion of the pipe is a perforated area with a length of 150 mm, a pore density of the perforated area is 5.927 PPI and a diameter is 1 mm.

5. A method for manufacturing a reinforced oil-absorptive membrane material comprising steps of:

(1) alkali-treating nonwoven fabric comprising: preparing aqueous sodium hydroxide with a concentration of 3 wt. %, dipping the nonwoven fabric into aqueous sodium hydroxide at 80° C. for 3 h, taking the nonwoven fabric out from the aqueous sodium hydroxide and drying, so as to obtain a surface engraved nonwoven fabric, wherein the nonwoven fabric is a spun-bonded spunlace blended nonwoven formed by polyethylene glycol terephthalate and polyamide by a proportion of 7:3;

(2) preparing the solution for membrane casting, wherein the membrane casting solution comprising:

mixing 0.5 g of graphene and 72.5 g of triethyl phosphate, performing ultrasonic dispersion for 3 hours to obtain graphene dispersion, then adding 12 g of polyvinylidene fluoride, 10 g of diethyl phthalate, 5 g of hydrophobic titanium dioxide into liquid of the graphene dispersion, stirring at 70° C. for 3 hours, so as to obtain the solution for membrane casting;

wherein the step (1) and the step (2) are not necessarily in order, and can be carried out simultaneously according to the time arrangement of experiments;

(3) preparing the oil absorbing layer, comprising: tiling the nonwoven fabric pre-treated in the step (1), fixing the nonwoven fabric on the glass plane, soaking the nonwoven fabric by 15 ml triethyl phosphate in previous and putting on a membrane casting equipment, wherein one end of the nonwoven fabric is fixed; the membrane casting solution prepared in the step (2) is evenly poured on a surface of the nonwoven fabrics, turning on the membrane casting equipment to evenly cover the membrane casting solution on a surface of the nonwoven fabrics, then the glass plane with nonwoven fabrics fixed thereon is dipped into water at 20° C. for 24 hours taking out, then dipping into absolute ethyl alcohol for 24 hours to extract pore-forming agent, drying, so as to obtain a single coating reinforcement membrane, performing secondary knifing on the single covered reinforced membrane by the membrane casting solution, then dipping the glass plane into water at 20° C. for 24 hours, and then into ethyl alcohol for 24 hours in sequence, drying, in such a manner that the oil-absorbing layer is obtained;

(4) preparing the reinforced oil-absorptive material comprising: winding the oil absorbing layer obtained in the step (3) on a tube wall of the tubular support, wherein the nonwoven with the oil absorbing layer completely covers the plurality of holes on the tubular support, two ends of the oil-absorbing layer is adhesively sealed and fixed at a tube wall of the polyurethane tube, pressing position of the winding layer is adhesively sealed, so as to obtain the reinforced oil-absorptive material, wherein an external diameter of the polyurethane pipe is 10 mm, a thickness of the pipe wall is 2 mm, a length thereof is 210 mm, and two end of the pipe are respectively two sclausura areas with a length of 30 mm, and a middle portion of the pipe is a perforated area with a length of 150 mm, a pore density of the perforated area is 5.488 PPI and a diameter is 1.2 mm.

* * * * *